United States Patent Office

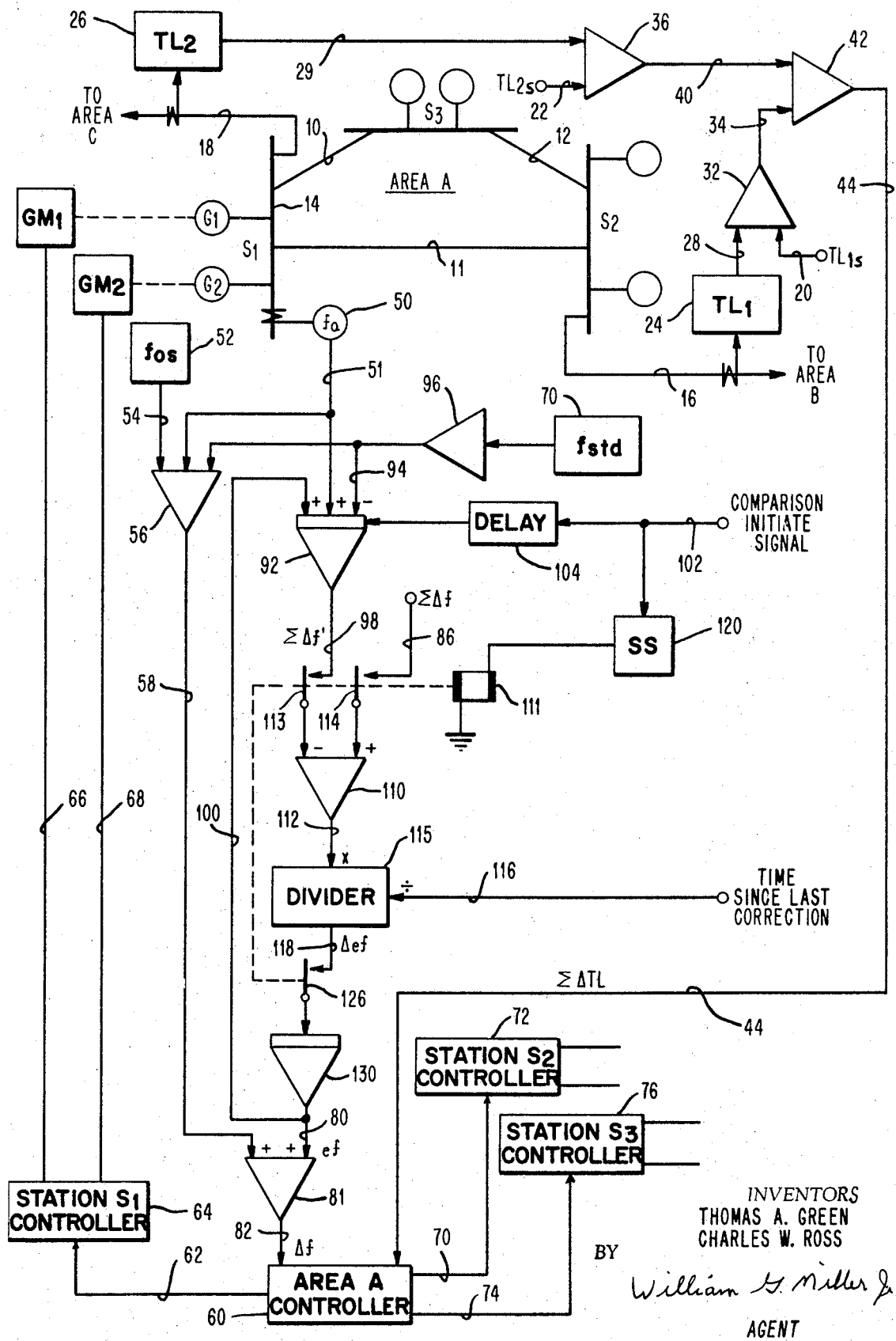

3,521,078
Patented July 21, 1970

3,521,078
DETERMINATION OF CORRECTIONS FOR FREQUENCY DEVIATION MEASUREMENT ERRORS IN AREAS OF AN INTERCONNECTED POWER DISTRIBUTION SYSTEM
Thomas A. Green, Roslyn, and Charles W. Ross, Hatboro, Pa., assignors to Leeds & Northrup Company, Philadelphia, Pa., a corporation of Pennsylvania
Filed Oct. 9, 1968, Ser. No. 766,279
Int. Cl. H02j 3/00
U.S. Cl. 307—57                          10 Claims

ABSTRACT OF THE DISCLOSURE

A method and means for determining the magnitude of the error in the frequency deviation measurement in an area of an interconnected power distribution system with reference to another area which is taken as the standard. During each of consecutive periods of time the time deviation change measured in the reference area is converted to a measure of cycles change and that change is compared with the cycles change in the area for which the error is being determined. The differences obtained for each period are accumulated to produce a continuously updated correction signal which is added to the frequency deviation to compensate that measurement for differences from the reference standard. The standardized measurement is used in control to reduce inadvertent interchange which would otherwise occur as a result of controlling from an incorrect frequency deviation measurement.

BACKGROUND OF THE INVENTION

This invention relates to a method and means for determining the error in the measurement of frequency deviation resulting from steady state measurement errors. The errors may be introduced by any of the elements used in producing frequency deviation.

In the control of the power distribution of several areas interconnected to form a large power system, it is necessary to compute from a frequency measurement and a local frequency standard in each of the areas, the frequency deviation upon which the control of the load in that area is to be based. When there is a steady state drift or offset in the output of the frequency standard or the frequency transducer, for example, there is produced an error in the frequency deviation measurement of the associated area. Since the frequency deviation measurement at one of the areas is considered as a reference for the entire interconnection, there will be a disparity between the frequency deviation measurements of the areas. One result of such an erroneous frequency deviation measurement is that any control responsive to that measurement will be influenced in such a way that there will be an inadvertent interchange of power between areas of the interconnection. It is advantageous that such inadvertent interchanges be minimized and, therefore, it is desirable to compensate for drift in the frequency deviation measurements made in the areas so as to avoid unintentional inadvertent interchange as much as possible.

In the past, each area has utilized its own standard and its own frequency measurement in order to calculate the frequency deviation upon which its control of its power distribution is based, and there has been little attention paid to steady drifts in the frequency standard or steady state errors in the frequency measurement except on such a long term basis as to jeopardize control over inadvertent interchange.

SUMMARY OF THE INVENTION

In order to obtain a correction signal representing the error in the frequency deviation measurement for an area of an interconnected power distribution system, the novel method includes, as one step, producing a first signal responsive to the change in the integral of a reference standard-frequency source during a particular interval. In addition to that step the method includes the producing of a second signal in response to a change in the integral of the frequency of the local standard of one of the areas of the interconnected power distribution, the second signal being produced in response to a change during the same particular interval as referred to regarding the first signal. In response to the difference between the first and second signals there is produced the correction signal for the particular interval involved.

BRIEF DESCRIPTION OF THE DRAWINGS

The figure is a diagram in block form showing a circuit arrangement which operates in accordance with the novel method.

DESCRIPTION OF THE PREFERRED EMBODIMENT

Referring to the figure, the interconnected power distribution system may be considered as being made up of three areas; namely, areas A, B and C. Each of the areas is made up of an interconnected group of generating stations in a particular geographical area which are generally designed to supply the load for that area and are controlled so as to maintain a set frequency while supplying the load of the area. In the figure area A is shown as including stations $S_1$, $S_2$ and $S_3$ which may be interconnected as shown by lines 10, 11 and 12 so as to supply the loads, which are not shown. Station $S_1$, for example, may include two generating sources $G_1$ and $G_2$ both of which are connected to the bus 14 and hence to the interconnecting lines 10 and 11.

In the figure, the area A is tied to area B by tie line 16 and is also tied to area C by tie line 18. Under normal circumstances, the power flowing over the tie lines 16 and 18 is scheduled to be at a predetermined value. For example, the tie line flow over tie line 16 may be scheduled to be at a value represented by the signal $TL_{1s}$ supplied on line 20 while the schedule wor the power flow over tie line 18 may be a signal of value $TL_{2s}$ as supplied on line 22.

The actual tie line power flows over the tie line 16 and tie line 18 are measured respectively by power flow meters 24 and 26 which respectively retransmit signals representing the tie line power flow on lines 28 and 29.

Thus, the amplifier 32 is operable to compare the scheduled tie line interchange over line 16 with the actual tie line interchange so as to produce on line 34 a signal representative of the tie line deviation. Similarly, amplifier 36 compares the tie line interchange measured on tie line 18 with the scheduled value represented by the signal on line 22 so as to produce on line 40 a signal representative of the tie line interchange deviation for tie line 18.

Amplifier 42 is operative to sum the tie line interchange deviations so as to produce on line 44 a signal $\Sigma \Delta TL$ representing the net tie line interchange deviation from schedule. In order to properly control the distribution of power between the generating sources in the individual stations such as station $S_1$ by controlling the output of the individual generators $G_1$ and $G_2$, it is also necessary to measure the system frequency of the interconnection as by frequency measuring transducer 50 which supplies on line 51 a signal representative of the actual frequency common to all means of the interconnected system.

In order to determine the control necessary to absorb any load change in an area such as area A, the actual frequency as measured by frequency transducer 50 must be compared with the scheduled frequency. The scheduled frequency may be determined by the sum of the output of a frequency standard 70 and a frequency offset setter 52. The comparison is made by amplifier 56 which receives from line 51 a signal representing the actual frequency and from line 94 a signal representing the standard frequency along with a signal on line 54 representing any desired offset of the scheduled frequency from the standard value to provide on line 58 a signal representing the deviation of the actual frequency from its scheduled value. Normally, with the signal representing the deviation of the frequency from its scheduled value and the signal representing the deviation of the net tie line interchange from its scheduled value, an area controller such as controller 60 for area A can provide on lines 62, symbolically represented as line 62, signals to the station controller for station $S_1$ shown as block 64, a signal which will allow the station controller to produce on lines 66 and 68, respectively, control signals which will actuate governor motors $GM_1$ and $GM_2$ so as to control the output of generators $G_1$ and $G_2$, respectively, in accordance with the desired distribution of the load as determined by controllers 60 and 64. Controllers 60 and 64 may be designed to be similar to the area and station controllers shown in C. Nichols et al. U.S. Pat. 2,692,342, issued Oct. 19, 1954.

The determination of frequency deviation, as by amplifier 56, is subject to any errors in the actual frequency measurement made by frequency transducer 50 as well as by any errors in the frequency standard 70. These errors will normally have a long term effect on the control of the power generated in the area since the signal on line 58 from amplifier 56 is one of the prime signals from which the area control signals are established as, for example, on line 62 to station controller 64 as well as line 70 to station controller 72 and line 74 to station controller 76. The station controllers 72 and 76 are, respectively, controllers for the stations $S_2$ and $S_3$ and are similar to the controller 64. For purposes of simplicity, the connections to the respective governor motors are not shown since those connections and the arrangement of the governor motors is similar to that shown for $S_1$.

It is desirable to compensate for any steady state errors in the production of the signal on line 58. This may be accomplished by establishing a correction signal $e_f$ on line 80 which represents the error in the measurement of frequency deviation and which can be added to the signal on line 58 by amplifier 81 and modify it sufficiently to compensate for the erroneous signal on line 58 so as to produce on line 82 a corrected signal $\Delta f$ which is introduced into the area controller 60 instead of the signal on line 58 which would normally be used in prior art systems.

In order to establish the magnitude of the signal on line 80 it is necessary to compare the measured frequency as determined by the frequency transducer 50 as well as the output of the frequency standard 70 with the corresponding frequency measurement and the frequency standard in a particular area which is considered as a reference area and provided with a highly accurate frequency standard. The comparison is based on a measurement referred to as the frequency deviation integral, which is the continuous integral of the frequency deviation ($\Sigma \Delta f'$ for area A) taken over an interval of time. In order to make the comparison, the corresponding frequency deviation integral $\Sigma \Delta f$ must be available for the reference area also. Conventionally, $\Sigma \Delta f$ is calculated by receiving the time deviation measurement from the reference area at various intervals. Time deviation is the continuous integral of the frequency deviation divided by the standard frequency. The comparison is then made with the values obtained for the time periods corresponding to the intervals by computing the frequency deviation integral $\Sigma \Delta f$ as the change in time deviation over the interval multiplied by the reference frequency, while $\Sigma \Delta f'$ is calculated by integrating the frequency deviation of area A over the same interval. The signal $\Sigma \Delta f$ is computed and made available on line 86 while a signal representing the duration of the interval is made available on line 116.

To establish the frequency deviation integral for area A during the particular interval referred to, integrating amplifier 92 is provided. This amplifier has as one of its inputs a signal on line 94 representing the output of the frequency standard 70 after its sign has been changed by amplifier 96. Integrating amplifier 92 is therefore operative to compare the actual frequency as represented by the signal on line 51 with the local standard frequency as represented by the signal on line 94 and the difference is integrated by amplifier 92 during each interval so as to produce on line 98 a signal representative of the frequency deviation integral for area A, $\Sigma \Delta f'$. The signal on line 98 is corrected for any steady state errors by the introduction of signal $e_f$ from line 80 by way of line 100. The signal on line 100 represents the correcting signal calculated during the last interval for which the frequency deviation integral of area A was calculated and compared with that from the reference area. A comparison initiate signal is provided on line 102 at the end of each interval during which $\Sigma \Delta f$ is calculated. These signals are introduced through a delay circuit 104 to the resetting terminal of integrating amplifier 92. The integration is begun from a zero value by the amplifier 92 after each resetting of the integrator.

The magnitude of the delay introduced by delay circuit 104 need only be sufficient to allow for updating $e_f$.

The signals on lines 86 and 98 when connected to amplifier 110 by contacts 113 and 114 produces on line 112 a signal which is representative of the difference between the frequency deviation integral computed for area A and that of area B over the comparison interval. The divider circuit 115 is operative to divide the signal from line 112 by the signal from line 116. The divider 115 averages the difference between the frequency deviation integrals over the interval of comparison. This produces on line 118 a signal $\Delta e_f$ representative of the number of cycles per second correction required for the previous averaging interval in addition to the previously accumulated amount $e_f$.

By means of the single-shot circuit 120 the initative signal supplied on line 102 is utilized to produce upon the appearance of each signal a single pulse of fixed duration which will energize relay actuators 111 so as to close relay contacts 126, 113 and 114. The pulses length is selected such that the integration in amplifier 130 modifies the value $e_f$ on line 180 by the amount $\Delta e_f$. The integrating amplifier 130 serves to accumulate the correction signals determined during each of the consecutive comparison intervals so as to provide on line 80 a correction signal $e_f$ representing the error of the local frequency measurement which must be used to correct for the errors in the signal on line 58 and provide a signal on line 82 which will allow controller 60 to effect control of the generation of area A in such a manner as to minimize any inadvertent interchange of power over the tie lines 16 and 18.

What is claimed is:

1. A method for producing a correction signal representing the error in the frequency deviation measurement for an area of an interconnected power distribution system comprising the steps of
   producing a first signal responsive to the change in the the integral of the frequency of a reference standard-frequency source during a particular interval,
   producing a second signal in response to a change in the integral of the frequency of the local standard of one of the areas during said particular interval, and
   producing said correction signal in response to the difference between said first and second signals.

2. The method set forth in claim 1 in which said first signal is representative of the frequency deviation integral in a reference area over said particular interval and said second signal is representative of the frequency deviation integral in said one area over said particular interval.

3. A method as set forth in claim 1 in which said correction signal is produced in response to the dividend resulting from the difference between said first and second signals divided by the duration of said particular interval.

4. A method as set forth in claim 3 in which said correction signal is produced by summing the dividends produced for consecutive intervals.

5. A method as set forth in claim 4 in which second signal for a particular interval is responsive to the correction signal produced for the previous interval.

6. A method as set forth in claim 1 which includes the step of modifying a signal representing the frequency deviation from the schedule of the area in accordance with said correction signal to obtain a standardized frequency deviation measurement.

7. A method for obtaining a correction signal for the frequency deviation measurement for the control of an area of an interconnected power distribution system comprising the steps of
producing a first signal responsive to the frequency deviation integral in a reference area over each of a sequence of time intervals,
producing for each of the other areas of said interconnection a second signal in response to the frequency deviation integral in each of said other areas over each of said time intervals, and
producing for each of said other areas a correction signal in response to the difference between said first and second signals for the respective other areas.

8. The method as set forth in claim 6 which additionally includes the step of modifying signals representing the frequency deviation from schedule in each area in accordance with ccorresponding correction signals to produce a standardized frequency deviation signal for each of said other areas.

9. The method as set forth in claim 7 which additionally includes controlling the generation in the respective areas in response to the standardized frequency deviation measurements of those respective areas to minimize the inadvertent interchange of power therebetween due to frequency measurement errors.

10. Apparatus for obtaining a standardized frequency deviation measurement for an area of an interconnected power distribution system comprising
means for producing a first signal responsive to the change in the integral of the frequency of a reference standard-frequency source during a particular interval,
means for producing a second signal in response to a change in the integral of the frequency of the local standard of one of the areas during said particular interval,
means for producing correction signals in response to to the difference between said first and second signals and
means for modifying the frequency deviation measurement at said area in accordance with the correction signal standardize said measurement to said standard-frequency source.

References Cited
UNITED STATES PATENTS
3,124,699   3/1964   Kirchmayer _____ 307—57

ROBERT K. SCHAEFER, Primary Examiner

H. J. HOHAUSER, Assistant Examiner

U.S. Cl. X.R.

235—151

PO-1050
(5/69)

UNITED STATES PATENT OFFICE
CERTIFICATE OF CORRECTION

Patent No. 3,521,078            Dated July 21, 1970

Inventor(s) Thomas A. Green and Charles W. Ross

It is certified that error appears in the above-identified patent and that said Letters Patent are hereby corrected as shown below:

Column 2, line 43, change "wor" to --for--.

Column 4, line 44, change "initative " to --initiate--;
Column 4, line 50, change "180" to --80--;
Column 4, line 65, omit "the" (second occurrence).

Column 5, line 4, change "dividend" to --quotient--;
Column 5, line 8, change "dividends" to --quotients--;
Column 5, line 35, change "ccorresponding" to --corresponding--.

Column 6, line 18, omit "to" at end of line;
Column 6, line 23, after "signal" insert --to--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents